United States Patent
Mendez et al.

(10) Patent No.: US 8,429,548 B2
(45) Date of Patent: Apr. 23, 2013

(54) AUTOMATICALLY SUGGESTING GRAPHICAL PROGRAM ELEMENTS FOR INCLUSION IN A GRAPHICAL PROGRAM

(75) Inventors: Jonathan Mendez, Austin, TX (US); Brett F. Phillips, Leander, TX (US)

(73) Assignee: National Instruments Corporation, Austin, TX (US)

( * ) Notice: Subject to any disclaimer, the term of this patent is extended or adjusted under 35 U.S.C. 154(b) by 528 days.

(21) Appl. No.: 12/707,824

(22) Filed: Feb. 18, 2010

(65) Prior Publication Data
US 2011/0202887 A1  Aug. 18, 2011

(51) Int. Cl.
*G06F 3/048* (2006.01)
*G06F 3/00* (2006.01)
*G06F 9/44* (2006.01)

(52) U.S. Cl.
USPC ........... 715/764; 715/708; 715/811; 715/821; 715/825; 715/967; 717/105; 717/113

(58) Field of Classification Search ................... 715/967, 715/821, 811, 708, 825; 717/105, 113
See application file for complete search history.

(56) References Cited

U.S. PATENT DOCUMENTS

| 5,506,952 | A |   | 4/1996  | Choy et al. |
| 5,644,686 | A |   | 7/1997  | Hekmatpour |
| 5,784,275 | A |   | 7/1998  | Sojoodi et al. |
| 5,966,532 | A |   | 10/1999 | McDonald et al. |
| 6,064,409 | A |   | 5/2000  | Thomsen et al. |
| 6,351,693 | B1 |  | 2/2002  | Monie et al. |
| 6,366,300 | B1 | * | 4/2002 | Ohara et al. ................... 715/771 |
| 6,757,002 | B1 | * | 6/2004 | Oross et al. .................... 715/864 |
| 6,784,902 | B1 |  | 8/2004  | Melder et al. |
| 6,944,825 | B2 | * | 9/2005 | Coco et al. ..................... 715/716 |
| 6,971,065 | B2 | * | 11/2005 | Austin ......................... 715/763 |
| 7,137,071 | B2 |  | 11/2006 | Fuller et al. |
| 7,322,023 | B2 | * | 1/2008 | Shulman et al. .............. 717/112 |
| 7,603,652 | B2 | * | 10/2009 | Makowski et al. ........... 717/105 |
| 7,661,088 | B2 | * | 2/2010 | Burke ........................... 717/105 |
| 2011/0125667 | A1 | * | 5/2011 | Faludi et al. .................. 705/348 |

* cited by examiner

*Primary Examiner* — Tadeese Hailu
*Assistant Examiner* — Nicholas Ulrich
(74) *Attorney, Agent, or Firm* — Meyertons Hood Kivlin Kowert & Goetzel, P.C.; Jeffrey C. Hood; Mark S. Williams

(57) ABSTRACT

System and method for editing a graphical program. One or more nodes are included in a graphical program in response to user input selecting the one or more nodes, where each node has a respective one or more terminals for receiving input to or providing output from the node. User input is received indicating a terminal on a first node of the one or more nodes to which a node is to be connected. One or more suggested graphical program elements to include in the graphical program are automatically presented based on the indicated terminal, where the one or more suggested graphical program elements are selectable by the user for inclusion in the graphical program.

26 Claims, 12 Drawing Sheets

AUTOMATICALLY SUGGESTING GRAPHICAL PROGRAM ELEMENTS FOR INCLUSION IN A GRAPHICAL PROGRAM

FIELD OF THE INVENTION

The present invention relates to the field of graphical programming, and more particularly to a system and method for automatically suggesting graphical program elements for inclusion in a graphical program.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

U.S. Pat. No. 7,137,071 titled "System and Method for Providing Suggested Graphical Programming Operations," which is incorporated by reference herein, discloses an approach to creation of graphical programs wherein nodes are suggested for inclusion in a graphical program based on the nodes already present in the program.

It would be desirable to make graphical programming even easier for the user by enabling a graphical programming development environment to automatically suggest graphical program elements to include in a graphical program depending on other attributes of the nodes which the user has already included in the graphical program.

SUMMARY OF THE INVENTION

Various embodiments of a system and method for editing a graphical program are presented below.

One or more nodes may be included in a graphical program in response to user input selecting the one or more nodes. The graphical program may include a plurality of interconnected nodes that visually indicate functionality of the graphical program, and may be executable to perform any functionality desired. For example, the graphical program may be operable to perform one or more of: an industrial automation function, a process control function, or a test and measurement function, among others. Moreover, as indicated above, in some embodiments, the graphical program may be or include a graphical data flow program.

Each of the one or more nodes may include a respective one or more terminals for receiving input to or providing output from the node. In other words, each node may include at least one terminal for communicating data with other program elements. For example, a node may include one or more input terminals that may be connected to one or more other nodes in the program, or to a "front panel" terminal associated with a GUI element, e.g., a control, of a GUI for the program, which may be referred to as a front panel. The node may thus receive input during execution from the other nodes and/or the front panel control via the one or more input terminals. Similarly, a node may include one or more output terminals that may be connected to one or more further nodes in the program, or to a "front panel" terminal associated with a GUI element, e.g., an indicator, of a GUI for the program. The node may thus provide output during execution to the further nodes and/or the front panel indicator via the one or more output terminals.

The nodes in the graphical program may be included or placed in the program by any of a variety of ways. For example, as described above, the user may select the one or more nodes from a visual palette that displays a plurality of available nodes, the user may utilize menu or keyboard commands to include the one or more nodes, etc., as desired.

User input may be received selecting a terminal on a first node of the one or more nodes in the graphical program to which a node is to be connected. For example, the user may click on a terminal of the first node, or click on the first node, then right-click to invoke display of available terminals from which the terminal is selected, etc., as desired. In one embodiment, the user may begin a "wiring" operation to connect the first node to another node, but without the target node being (currently) specified, e.g., by selecting the terminal of the first node and "dragging" the cursor away from the first node. In some embodiments, a wire (connection element) may automatically be displayed connecting the terminal of the first node to the cursor, such that as the cursor is moved around the graphical program, the wire stays connected, automatically adjusting to route around other nodes in the program as the cursor moves.

One or more suggested graphical program elements to include in the graphical program may be automatically presented or otherwise suggested to the user based on the selected terminal of the first node. The one or more suggested graphical program elements may be selectable by the user for inclusion in the graphical program. In other words, based on the selected terminal, at least one node may be automatically suggested for inclusion in the program.

In one embodiment, a first suggested node of the one or more suggested nodes may be included in the graphical program in response to user input selecting the first suggested node. Moreover, including the first suggested node in the graphical program may include automatically connecting a terminal of the first suggested node to the selected terminal of the first node in the graphical program. Additionally, in one embodiment, presentation of the one or more suggested nodes may be ceased in response to the user input selecting the first suggested node. In other words, once the user has selected a node to connect to, the other suggested nodes may no longer be displayed or otherwise presented to the user.

In one embodiment, each terminal of each node has a unique identification (ID). The method may include automatically analyzing information relating terminal IDs of the one or more nodes to respective terminal IDs of nodes most commonly connected to terminals of the one or more nodes, and automatically determining the one or more suggested nodes based on the automatic analysis. Thus, the one or more suggested nodes may be automatically presented in response to the automatic determination of the suggested nodes.

In various embodiments, the terminal IDs may be based on any of various attributes, as desired. For example, in some embodiments, each terminal ID may be based on or may encode the name or type of data or parameter (variable) communicated (i.e., input or output) via the terminal, the name or type of the node, or any other aspect of the node or terminal as desired, or even arbitrary alphanumeric strings. Any other schemes or implementations of terminal distinctions or IDs may be used as desired.

The information, analysis, and determination, regarding the relationships between terminal IDS of nodes may be implemented in any of a broad variety of ways. For example, in one embodiment, the information relating terminal IDs of the one or more nodes to respective terminal IDs of nodes most commonly connected to terminals of the one or more nodes is static. For example, the information may be in the form of a hard-coded lookup table, database, or rule-based or other type of expert system, among other implementations. In another embodiment, the analyzing and determining may include using a heuristic to determine the one or more suggested nodes based on the terminal IDs of the one or more nodes in the graphical program.

In a further embodiment, the information relating terminal IDs of the one or more nodes to respective terminal IDs of nodes most commonly connected to terminals of the one or more nodes includes previously stored data regarding connections between terminals of nodes in one or more other graphical programs. For example, the relative frequency of occurrence of connections between various terminals in one or more other graphical programs may be stored and analyzed to predict which nodes are most likely to be connected to the selected terminal. In a related embodiment, the previously stored data regarding connections between terminals of nodes in one or more other graphical programs may be specific to graphical programs created by the user. Thus, the information may include or identify common connections based on the program development history of the user, thus leveraging consistencies regarding the application domain and/or graphical programming tendencies, or even idiosyncrasies, of the user.

In one embodiment, the information may be specific to the current graphical program. For example, information regarding connections between terminals of nodes previously included in the graphical program may be stored, e.g., as the user makes respective connections, or by analyzing the interconnections of the nodes currently in the program. The information relating terminal IDs of the one or more nodes to respective terminal IDs of nodes most commonly connected to terminals of the one or more nodes may thus be or include the information regarding connections between terminals of nodes previously included in the graphical program. In another embodiment, the information may be generic to any of various graphical programs.

In one embodiment, the graphical program may be or include an object oriented graphical program, where the nodes and terminals have respective class inheritance hierarchies, and the information relating terminal IDs of the one or more nodes to respective terminal IDs of nodes most commonly connected to terminals of the one or more nodes may include relationships between the class inheritance hierarchy of the selected terminal and the class inheritance hierarchy of the one or more suggested nodes. Moreover, in further embodiments, some nodes may implement private member nodes of a class to which the graphical program does not have access, and the automatically analyzing may conditionally exclude suggesting nodes to which the graphical program does not have access.

In one embodiment, some nodes may be polymorphic nodes, where each polymorphic node includes two or more respective sub-nodes that are executable in lieu of the polymorphic node based on a type of terminal wired to the polymorphic node. The information relating terminal IDs of the one or more nodes to respective terminal IDs of nodes most commonly connected to terminals of the one or more nodes may further include information regarding sub-nodes of polymorphic nodes and terminals of sub-nodes of polymorphic nodes. In other words, the method may include analyzing the polymorphic aspects of the nodes (and terminal types), e.g., the sub-nodes implementing the polymorphism, in determining the suggested nodes to present to the user.

The suggested nodes may be presented to the user in any of a variety of ways. For example, in one embodiment, automatically presenting the one or more suggested nodes may include displaying the one or more suggested nodes as shadow nodes that follow a mouse cursor. In another embodiment, automatically presenting the one or more suggested nodes may include displaying the one or more suggested nodes in a palette or menu, where the one or more suggested nodes are selectable from the palette or menu by the user for inclusion in the graphical program. In further embodiments, these two techniques may be combined, e.g., the palette or menu may follow or be attached to the cursor. In a substantially different approach, automatically presenting the one or more suggested nodes may include providing audio suggestions indicating the one or more suggested nodes. Any other means of presenting the suggested nodes to the user may be used as desired.

Thus, embodiments of the systems and methods disclosed herein may facilitate more efficient editing of graphical programs.

BRIEF DESCRIPTION OF THE DRAWINGS

A better understanding of the present invention can be obtained when the following detailed description of the preferred embodiment is considered in conjunction with the following drawings, in which.

Figure 1A:
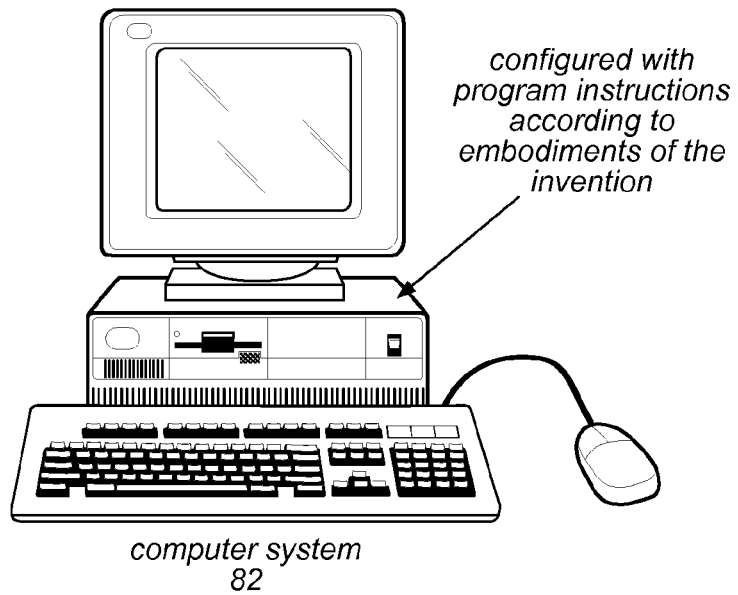
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

U.S. Pat. No. 7,137,071 titled "System and Method for Providing Suggested Graphical Programming Operations," filed Dec. 12, 2001.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

FIG. 1A—Computer System

FIG. 1A illustrates a computer system 82 configured to implement embodiments of the invention. One embodiment of a method for editing a graphical program is described below.

As shown in FIG. 1A, the computer system 82 may include a display device configured to display the graphical program as the graphical program is created, edited, and/or executed. The display device may also be configured to display a graphical user interface or front panel of the graphical program during editing or execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs, e.g., graphical programs, which are executable to perform the methods described herein. Thus, some embodiments of the invention may be implemented in software, e.g., by executable program instructions. Additionally, the memory medium may store a graphical programming development environment application used to create and/or execute such graphical programs, including graphical program elements for creating the graphical programs. As described in detail below, the graphical programming development environment may be operable to assist the user in creating or editing a graphical program by suggesting graphical programming elements for use in the graphical program. For example, in response to nodes or icons that the user has previously included in the graphical program, the graphical programming development environment may suggest additional nodes or icons, or graphical user interface elements, to include in the graphical program. The suggested elements may be presented, e.g., displayed, such that the user can very easily include the suggested elements in the graphical program if desired, thus improving the efficiency for developing the graphical program.

The memory medium may also store operating system software, as well as other software for operation of the computer system. Various embodiments further include receiving or storing instructions and/or data implemented in accordance with the foregoing description upon a carrier medium.

Figure 1B:
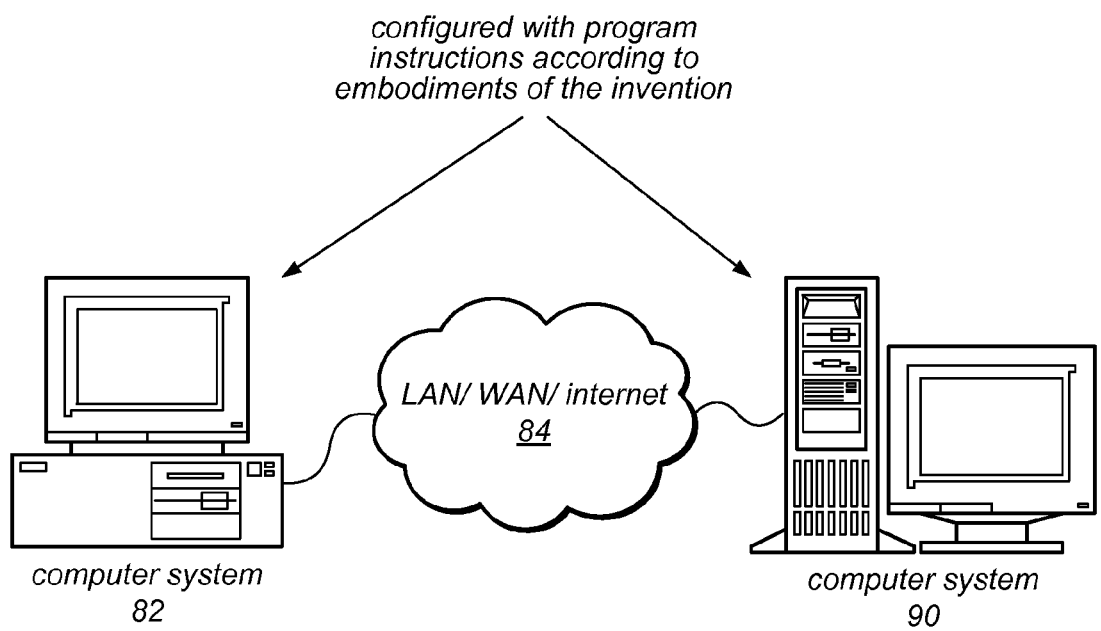
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
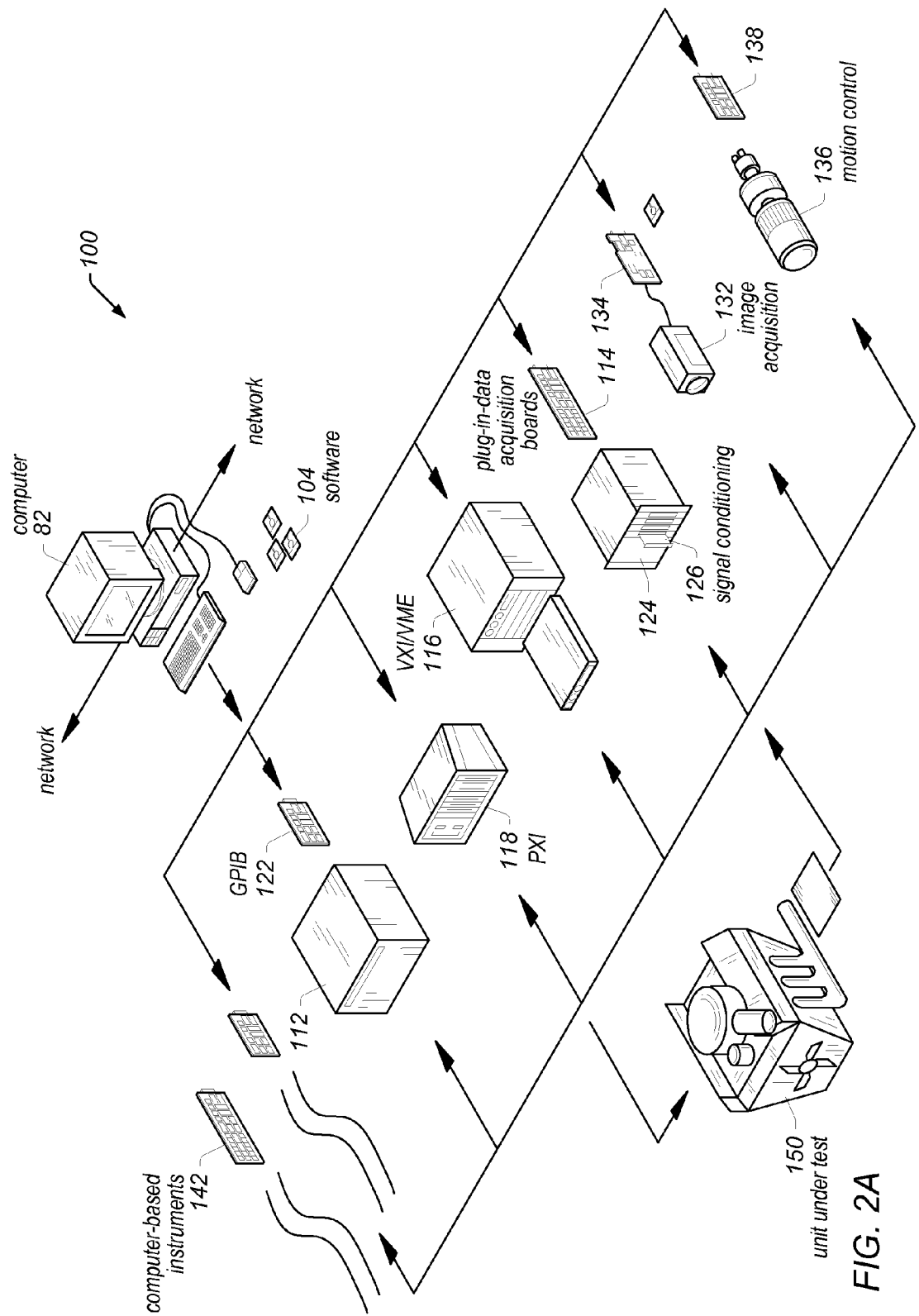
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
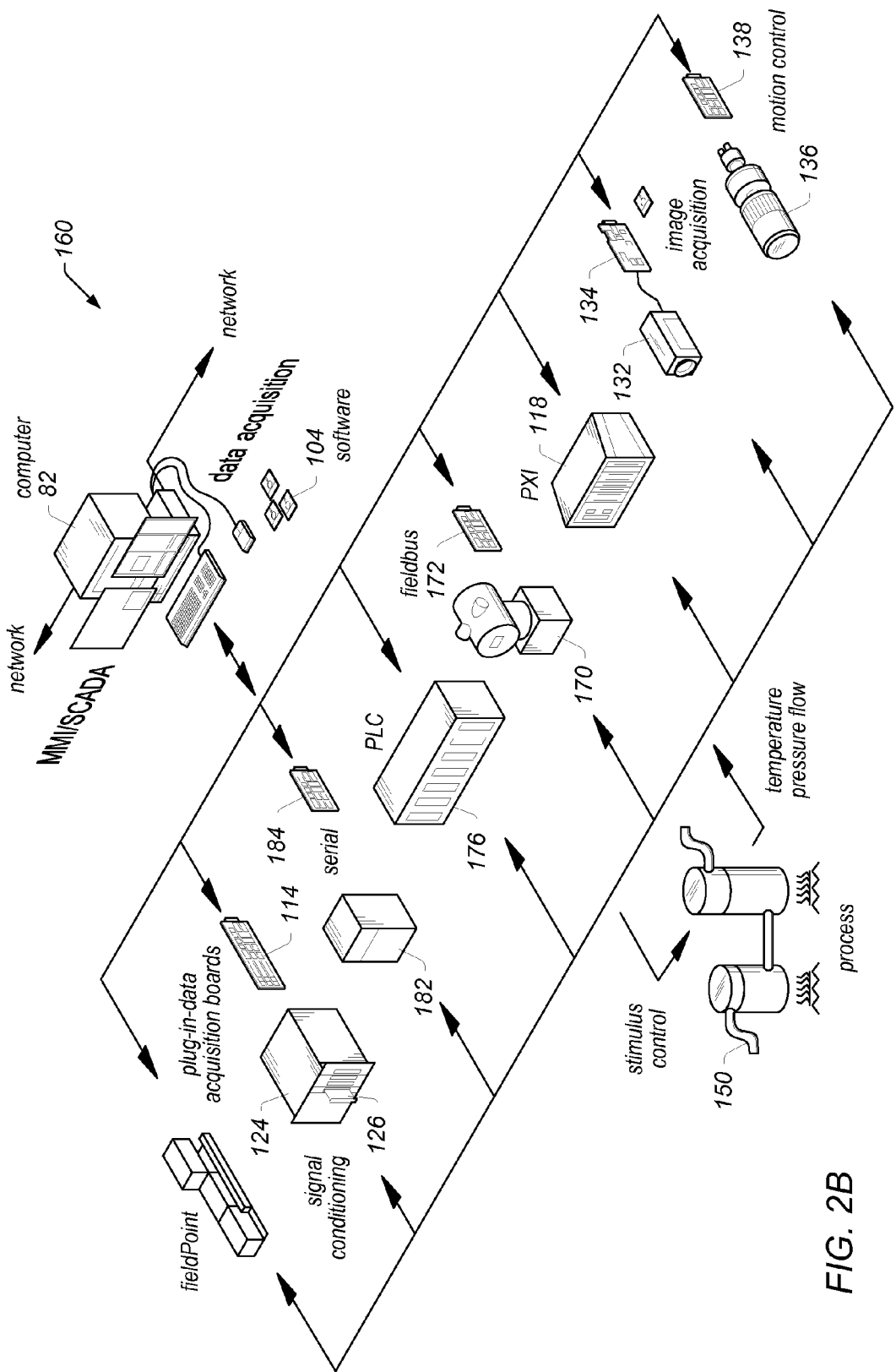
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
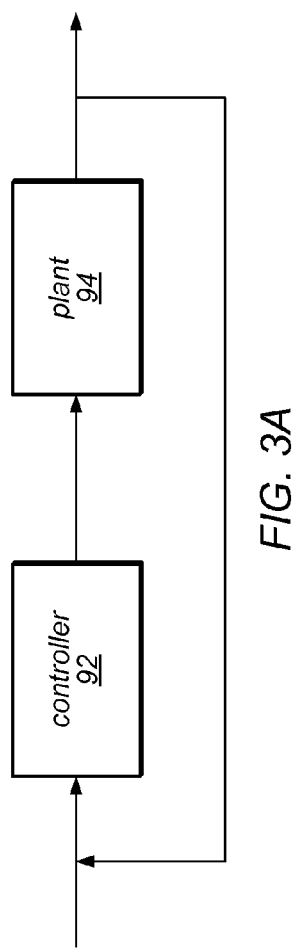
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
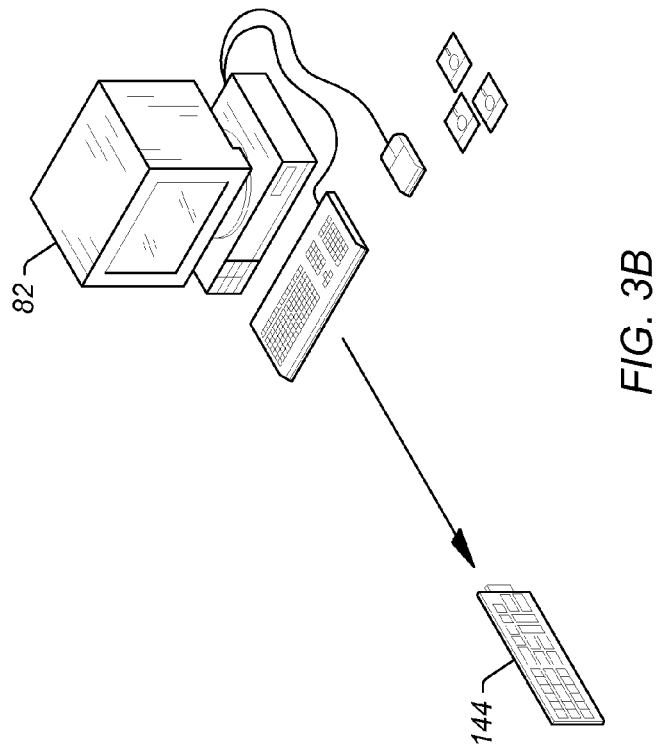
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create and/or edit a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
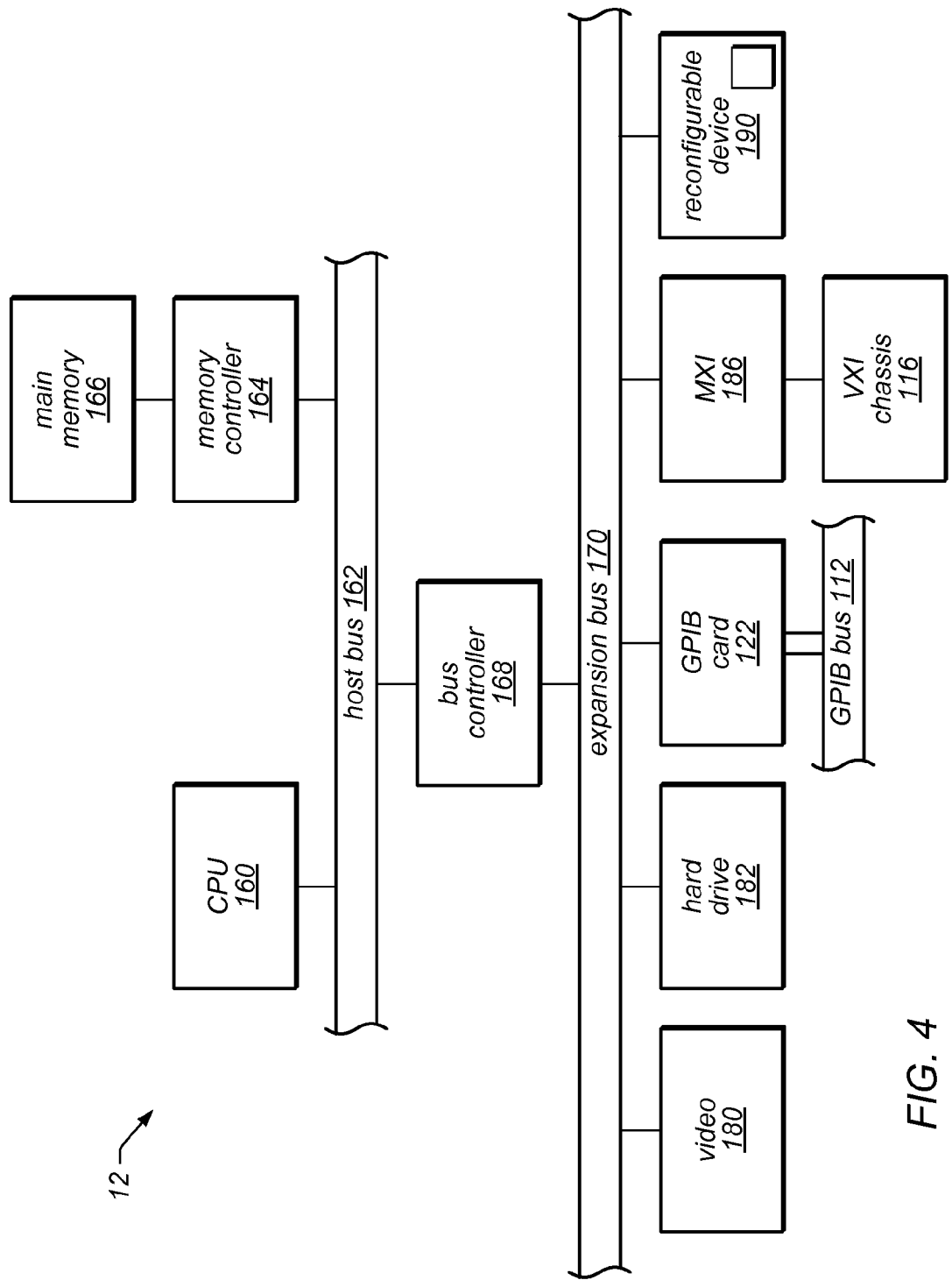
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store software implementing an embodiment of the invention, e.g., a graphical program development environment, as well as one or more graphical programs developed in such an environment. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Creating a Graphical Program

The following describes a general method for creating a graphical program. The method described may be used in conjunction with any of the computer systems or devices shown in the above Figures, among other devices, and may also be performed in conjunction with any of the techniques described below with reference to the method of FIG. 5. In various embodiments, some of the method elements described may be performed concurrently, in a different order than shown, or may be omitted. Additional method elements may also be performed as desired. As shown, this method may operate as follows.

First, a graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

Thus, a block diagram for the graphical program may be created, e.g., in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

As noted above, in some embodiments, a graphical user interface or front panel for the graphical program may be created, e.g., in response to user input. The graphical user interface may be created in any of various ways, e.g., depending on the graphical programming development environment used.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

The graphical program may then be executed, e.g., on any kind of computer system(s) or reconfigurable hardware, as described above.

Figure 5:
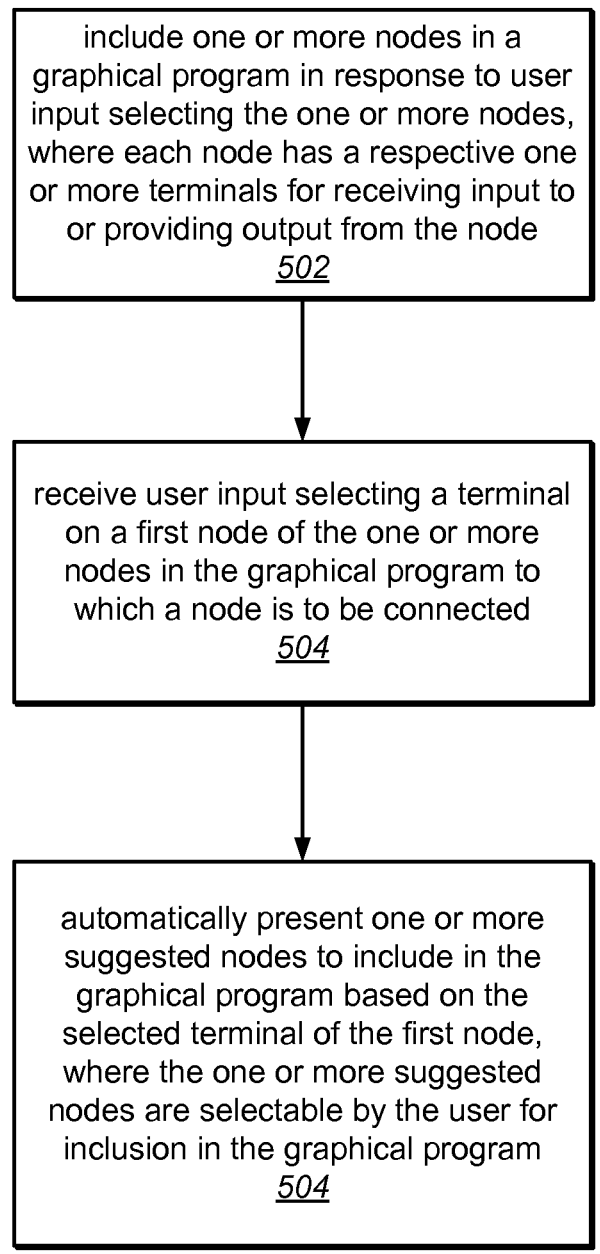
FIG. 5 is a flowchart diagram illustrating one embodiment of a method for editing a graphical program.

FIG. 5—Flowchart of a Method for Editing a Graphical Program

FIG. 5 illustrates a method for editing a graphical program, according to various embodiments. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, one or more nodes may be included in a graphical program in response to user input selecting the one or more nodes. The graphical program may include a plurality of interconnected nodes that visually indicate functionality of the graphical program, and may be executable to perform any functionality desired. For example, the graphical program may be operable to perform one or more of: an industrial automation function, a process control function, or a test and measurement function, among others. Moreover, as indicated above, in some embodiments, the graphical program may be or include a graphical data flow program.

Figure 6:
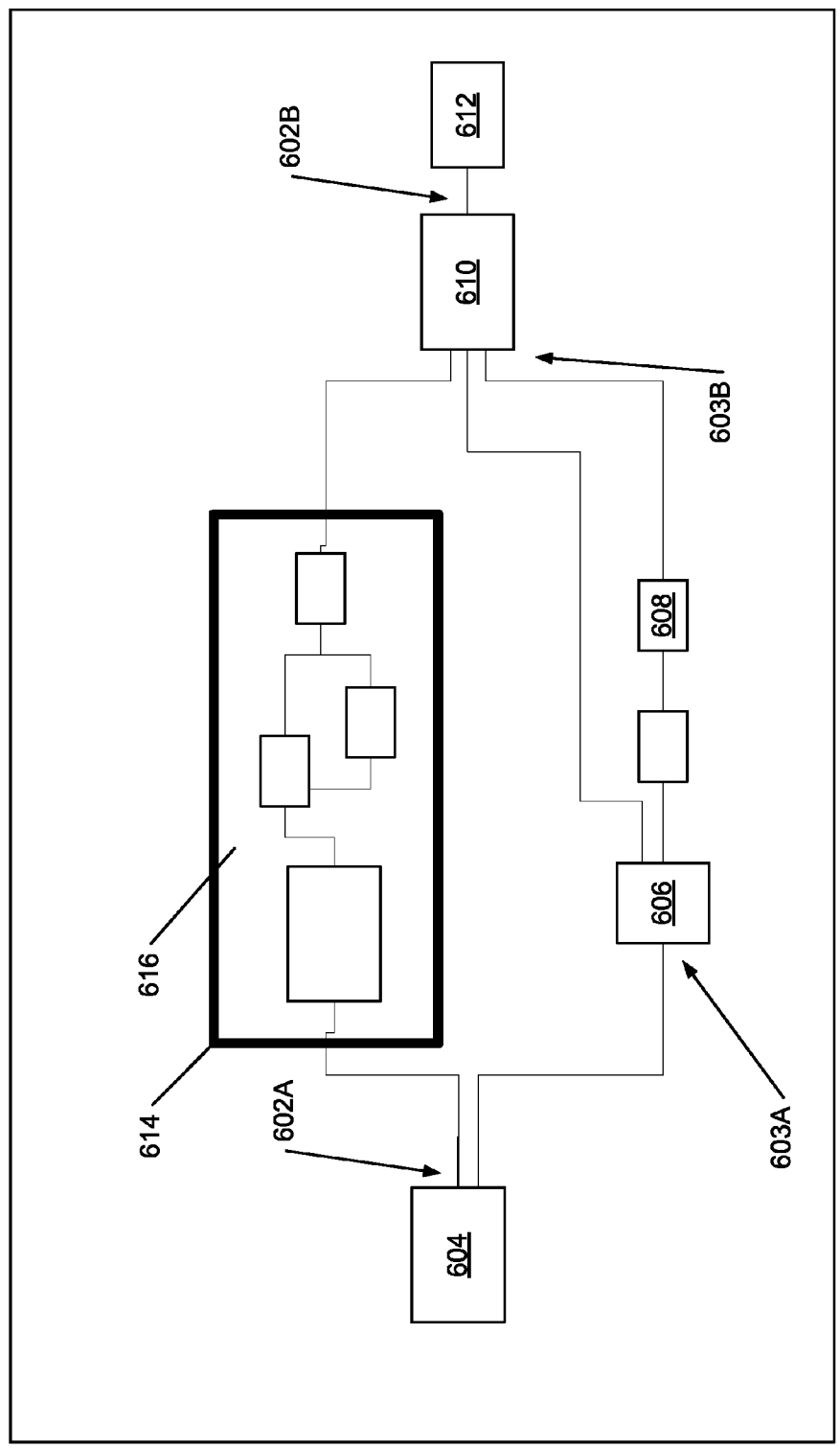
FIG. 6 illustrates an exemplary block diagram of a graphical program, according to one embodiment.

FIG. 6 illustrates an exemplary high-level embodiment of a graphical program, specifically, a block diagram of a graphical program, with various interconnected graphical program nodes, including a loop node 614 with contained graphical program code 616.

Each of the one or more nodes may include a respective one or more terminals for receiving input to or providing output from the node. In other words, each node may include at least one terminal for communicating data with other program elements. For example, a node may include one or more input terminals that may be connected to one or more other nodes in the program, or to a "front panel" terminal associated with a GUI element, e.g., a control, of a GUI for the program, which may be referred to as a front panel. The node may thus receive input during execution from the other nodes and/or the front panel control via the one or more input terminals. Similarly, a node may include one or more output terminals that may be connected to one or more further nodes in the program, or to a "front panel" terminal associated with a GUI element, e.g., an indicator, of a GUI for the program. The node may thus provide output during execution to the further nodes and/or the front panel indicator via the one or more output terminals.

Figure 7A:
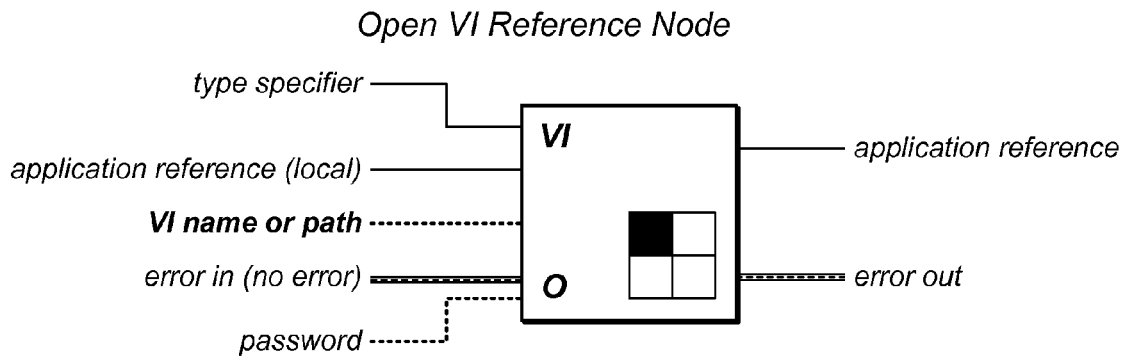
FIGS. 7A, 7B, and 7C illustrate exemplary graphical program nodes with terminals, according to one embodiment.
Figure 7B:
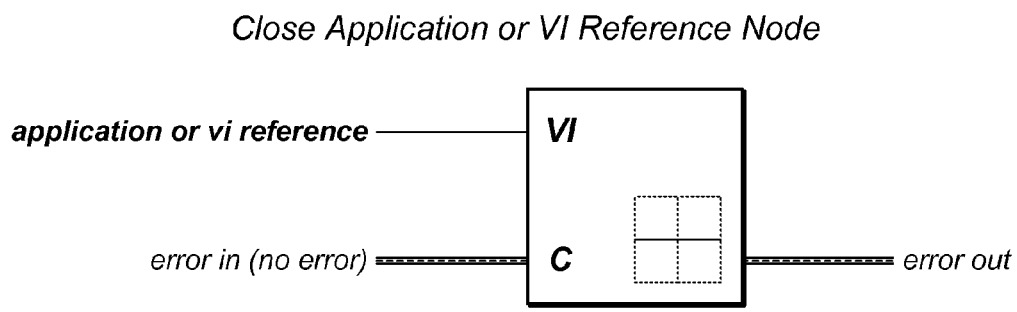
Figure 7C:
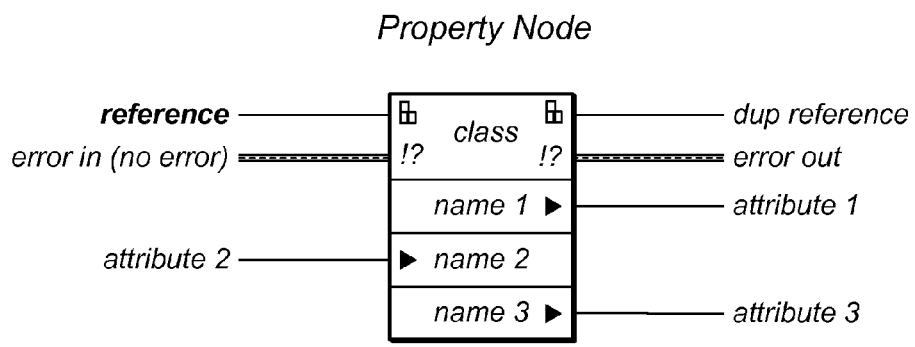

FIGS. 7A, 7B, and 7C illustrate respective exemplary graphical program nodes with input and output terminals for communicating with other graphical program elements. More specifically, FIG. 7A illustrates one embodiment of an Open VI Reference node that may be executable to return a reference to a VI specified by a name string or path to the VI's location on disk. In some embodiments, the Open VI Reference node can be used to obtain a reference to any VI. As may be seen, in this embodiment, the Open VI Reference node includes various input and output terminals, embodiments of which are described below:

- application reference is a reference to a LabVIEW application. If this input is left unwired, the reference is to an application on the local version of LabVIEW. If the input is wired, and the reference is to a remote version of LabVIEW, then the remote LabVIEW is queried to return the VI reference.
- type specifier is used for its data type only. The value of the input is ignored. The data type of the type specifier input determines the data type of the vi reference output.
- VI name or path is polymorphic and can accept a string containing the name of the desired VI, or a path containing the complete path (including the name) to the desired VI. If a name string is wired, then the VI must already be in memory. If a path is wired and the VI is already in memory, the VI in memory is obtained, whether its path is the same as the input or not. If the VI is not in memory, then the VI must be at the specified path for this function to succeed. If the VI is at that location, the VI is loaded into memory.
- error in describes error conditions that occur prior to the execution of this function. The default input of this cluster is no error.
- password is the plain-text password string for the VI. If the VI is not password protected, the input is ignored. If the VI is password protected and an incorrect password is entered, the VI can be referenced, but the VI cannot be edited through that VI reference.
- vi reference is the refnum associated with the requested VI. If the function fails, "not-a-refnum" is returned.
- error out contains error information. If error in indicates an error, error out contains the same error information. Otherwise error out describes the error status that this VI produces.

FIG. 7B illustrates one embodiment of a Close Application or VI Reference Node. As the name indicates, the Close Application or VI Reference node closes an open VI or the connection to a LabVIEW application instance. The following describes the inputs and outputs of the Close Application or VI Reference node:

- application or vi reference is the refnum associated with an open VI or a LabVIEW application instance.
- error in describes error conditions that occur prior to the execution of this function. The default input of this cluster is no error.
- error out contains error information. If error in indicates an error, error out contains the same error information. Otherwise it describes the error status that this node produces.

FIG. 7C illustrates one embodiment of a Property Node, which may set (write) or get (read) application, VI and VI object property information. For example, the property node may be used to change the color of a user interface object, etc. The inputs and outputs of the Property node are described below:

- reference is the refnum associated with a VI object, VI, or a LabVIEW application instance.
- error in describes error conditions that occur prior to the execution of this function. The default input of this cluster is no error.
- dup reference has the same value as reference.
- error out contains error information. If error in indicates an error, error out contains the same error information. Otherwise error out describes the error status that this node produces.

Note that the Property node also includes terminals corresponding to node attributes for getting and setting the attribute values, e.g., an input terminal for attribute 2, and output terminals for attribute 1 and attribute 3.

Thus, each of these nodes includes terminals for communicating with other graphical program elements. It should be noted that these nodes are exemplary only, and are not intended to limit the graphical program elements used to any form, function, or appearance.

Referring again to the graphical program or block diagram of FIG. 6, one may see, for example, that node 604 includes output terminals 602A whereby outputs may be provided to another element, e.g., to node 606 by wiring the terminals to input terminals 603A. Similarly, node 606 includes output terminals for providing output to input terminals 603B of node 610, which includes output terminals 602B for providing output to node 612.

The nodes in the graphical program may be included or placed in the program by any of a variety of ways. For example, as described above, the user may select the one or more nodes from a visual palette that displays a plurality of available nodes, the user may utilize menu or keyboard commands to include the one or more nodes, etc., as desired.

In 504, user input may be received selecting a terminal on a first node of the one or more nodes in the graphical program to which a node is to be connected. For example, the user may click on a terminal of the first node, or click on the first node, then right-click to invoke display of available terminals from which the terminal is selected, etc., as desired. In one embodiment, the user may begin a "wiring" operation to connect the first node to another node, but without the target node being (currently) specified, e.g., by selecting the terminal of the first node and "dragging" the cursor away from the first node. In some embodiments, a wire (connection element) may automatically be displayed connecting the terminal of the first node to the cursor, such that as the cursor is moved around the graphical program, the wire stays connected, automatically adjusting to route around other nodes in the program as the cursor moves.

In 506, one or more suggested graphical program elements to include in the graphical program may be automatically presented or otherwise suggested to the user based on the selected terminal of the first node. The one or more suggested graphical program elements may be selectable by the user for inclusion in the graphical program. In other words, based on the selected terminal, at least one node may be automatically suggested for inclusion in the program.

In one embodiment, a first suggested node of the one or more suggested nodes may be included in the graphical program in response to user input selecting the first suggested node. Moreover, including the first suggested node in the graphical program may include automatically connecting a terminal of the first suggested node to the selected terminal of the first node in the graphical program. Additionally, in one embodiment, presentation of the one or more suggested nodes may be ceased in response to the user input selecting the first suggested node. In other words, once the user has selected a node to connect to, the other suggested nodes may no longer be displayed or otherwise presented to the user.

Further Embodiments

The following describes various embodiments of the method of FIG. 5, although it should be noted that the embodiments disclosed are intended to be exemplary only, and are not intended to limit the techniques to any particular form, function, or appearance.

In one embodiment, each terminal of each node has a unique identification (ID). The method may include automatically analyzing information relating terminal IDs of the one or more nodes to respective terminal IDs of nodes most commonly connected to terminals of the one or more nodes, and automatically determining the one or more suggested nodes based on the automatic analysis. Thus, the one or more suggested nodes may be automatically presented in response to the automatic determination of the suggested nodes.

In various embodiments, the terminal IDs may be based on any of various attributes, as desired. For example, in some embodiments, each terminal ID may be based on or may encode the name or type of data or parameter (variable) communicated (i.e., input or output) via the terminal, the name or type of the node, or any other aspect of the node or terminal as desired, or even arbitrary alphanumeric strings. Any other schemes or implementations of terminal distinctions or IDs may be used as desired.

The information, analysis, and determination, regarding the relationships between terminal IDs of nodes may be implemented in any of a broad variety of ways. For example, in one embodiment, the information relating terminal IDs of the one or more nodes to respective terminal IDs of nodes most commonly connected to terminals of the one or more nodes is static. For example, the information may be in the form of a hard-coded lookup table, database, or rule-based or other type of expert system, among other implementations. In another embodiment, the analyzing and determining may include using a heuristic to determine the one or more suggested nodes based on the terminal IDs of the one or more nodes in the graphical program.

In a further embodiment, the information relating terminal IDs of the one or more nodes to respective terminal IDs of nodes most commonly connected to terminals of the one or more nodes includes previously stored data regarding connections between terminals of nodes in one or more other graphical programs. For example, the relative frequency of occurrence of connections between various terminals in one or more other graphical programs may be stored and analyzed to predict which nodes are most likely to be connected to the selected terminal. In a related embodiment, the previously stored data regarding connections between terminals of nodes in one or more other graphical programs may be specific to graphical programs created by the user. Thus, the information may include or identify common connections based on the program development history of the user, thus leveraging consistencies regarding the application domain and/or graphical programming tendencies, or even idiosyncrasies, of the user.

In one embodiment, the information may be specific to the current graphical program. For example, information regarding connections between terminals of nodes previously included in the graphical program may be stored, e.g., as the user makes respective connections, or by analyzing the interconnections of the nodes currently in the program. The information relating terminal IDs of the one or more nodes to respective terminal IDs of nodes most commonly connected to terminals of the one or more nodes may thus be or include the information regarding connections between terminals of nodes previously included in the graphical program.

The suggested nodes may be presented to the user in any of a variety of ways. For example, in one embodiment, automatically presenting the one or more suggested nodes may include displaying the one or more suggested nodes as shadow nodes that follow a mouse cursor. In another embodiment, automatically presenting the one or more suggested nodes may include displaying the one or more suggested nodes in a palette or menu, where the one or more suggested nodes are selectable from the palette or menu by the user for inclusion in the graphical program. In further embodiments, these two techniques may be combined, e.g., the palette or menu may follow or be attached to the cursor. In a substantially different approach, automatically presenting the one or more suggested nodes may include providing audio suggestions indicating the one or more suggested nodes. Any other means of presenting the suggested nodes to the user may be used as desired.

Figure 8A:
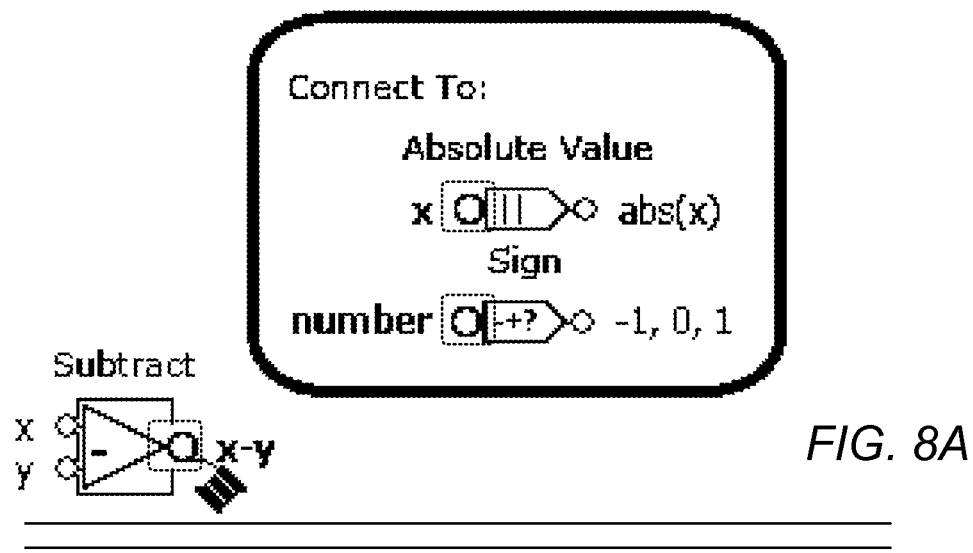
FIGS. 8A, 8B, and 8C illustrate an example presentation and selection of suggested nodes, according to one embodiment.
Figure 8B:
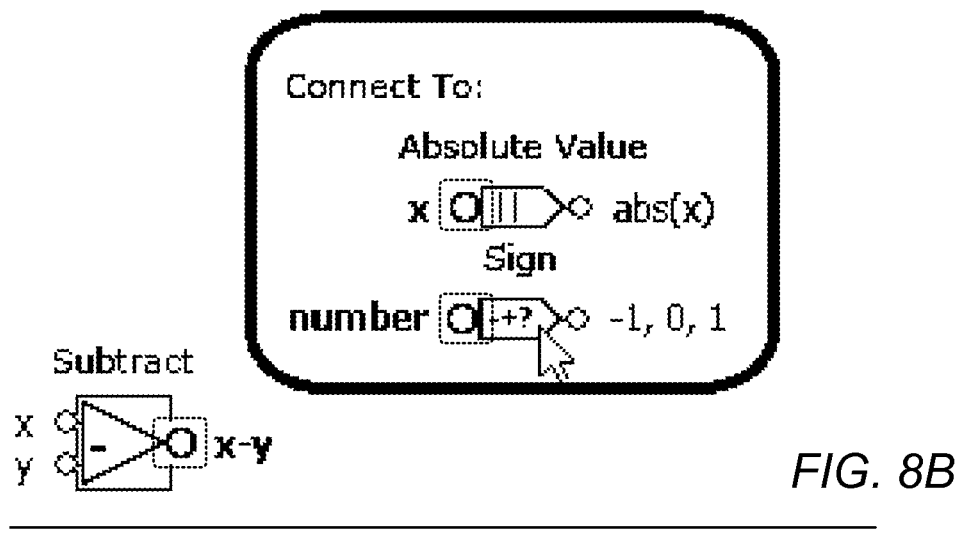
Figure 8C:
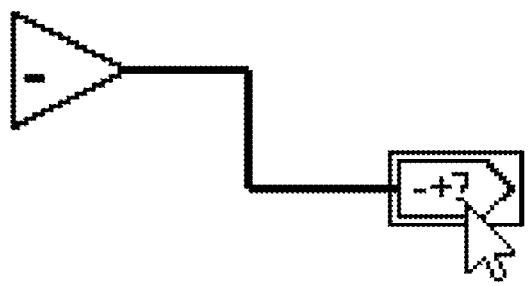

FIGS. 8A-8C illustrate one exemplary embodiment in which the user wishes to connect a subtract node to some as yet unspecified node. More specifically, FIG. 8A shows the subtract node, which takes two inputs, x and y, each with a corresponding input terminal seen on the left of the node, and outputs the difference, x−y, via a corresponding output terminal, shown on the right of the node. Per FIG. 8A, the user has selected the output terminal of the subtract node, as indicated by the tilted black rectangular marker shown next to the terminal. In response, a palette of two suggested nodes is presented, which in this example case includes an absolute value node and a number "sign" node. The absolute value node takes a value "x" as input via a terminal on the left of the node, and outputs the absolute value of the input (abs(x)) via a terminal on the right of the node, whereas the sign node takes a number as input and outputs a −1, 0, or 1, depending on whether the input value is negative, zero, or positive.

Thus, in response to the user selecting the output terminal of the subtract node, and the fact that from observing previous behavior of the user the system knows that the user frequently connects the output terminal of the Subtract node to the input terminal of the absolute value node or the input terminal of the sign node. a floating menu pops up which contains the two nodes, highlighting the terminals which are usually connected to the selected terminal.

FIG. 8B illustrates selection of the sign node from the palette by the user, denoted by the cursor placed on that node. In other words, the user has decided to connect the selected terminal to the input terminal of the sign node, and so the user moves the cursor to the sign node and clicks it.

Finally, FIG. 8C shows the subtract node connected to the selected sign node. In one embodiment, based on the cursor following or "ghosting" technique mentioned above, in response to receiving user input selecting a first suggested node from the one or more suggested nodes, the first suggested node may displayed as a shadow node that follows a mouse cursor. Note that since the user has made his selection, the floating menu has disappeared, and the selected node, connected to the previously selected terminal in the desired way, is now attached to the cursor, ready for the user to place it on the diagram. The first suggested node may then be included in the graphical program in response to user input indicating inclusion of the first suggested node in the graphical program. Thus, for example, in the illustrative embodiment of FIGS. 8B and 8C, upon selection of the sign node in FIG. 8B, the selected sign node may "stick" to the cursor until deposited at a particular location by the user.

In some embodiment, automatically presenting the one or more suggested nodes may include indicating at least one terminal on each of the one or more suggested nodes via which a connection to the selected terminal can be made. In other words, not only are the nodes themselves suggested, but a terminal on each suggested node may be indicated for connecting to the selected terminal of the first node. Thus, each of the presented suggested nodes may indicate one or more terminals suggested for connection to the selected terminal of the first node. In cases where a suggested node indicates two or more suggested terminals, the user may select which of the terminals to use. Note that the indicated, i.e., suggested, terminals may be indicated in any manner desired, e.g., by highlighting the suggested terminals, enlarging the suggested terminals, only showing the suggested terminals, i.e., omitting terminals that are not appropriate or suggested, etc., as desired.

Alternatively, in one variant of this approach, automatically presenting the one or more suggested nodes, and indicating at least one terminal on each of the one or more suggested nodes via which a connection to the selected terminal can be made may include: for each of the one or more suggested nodes, displaying a respective copy of the node for each indicated terminal of the node, including indicating the indicated terminal in the displayed copy. In other words, in the presentation of suggested nodes, only one (suggested) terminal is indicated per node icon, and in cases where a suggested node includes multiple terminals that are suitable for connecting to the selected terminal of the first node, respective copies of the node may be presented for each of the multiple indicated terminals. Thus, a suggested node with three different suitable or suggested terminals may be presented as three different versions, each with a respective suggested or indicated terminal. This may facilitate ease of selection of the correct node/terminal by the user.

Figure 9A:
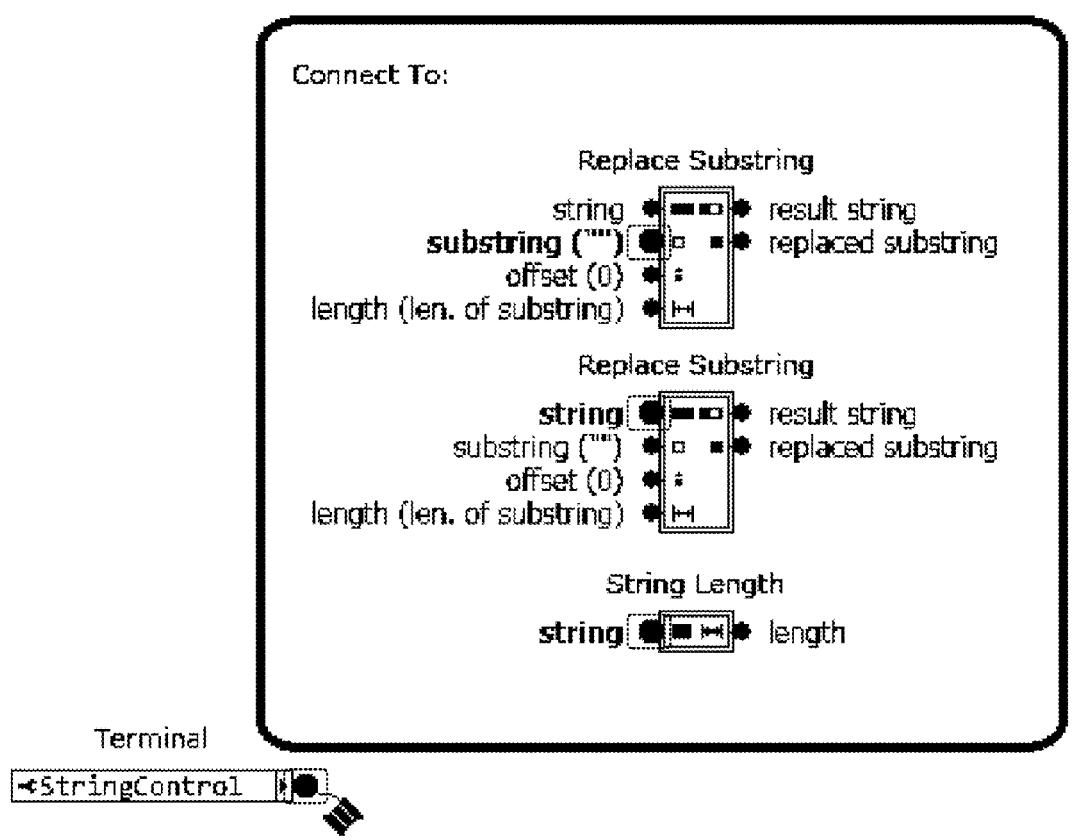
FIGS. 9A-9E illustrate more complex examples of presentation and selection of suggested nodes, according to one embodiment.

FIGS. 9A-9E illustrate exemplary embodiments of this technique. More specifically, FIG. 9A illustrates a "terminal" node, specifically, a string control node that is associated with a GUI element, e.g., a string input field or control on a GUI for the graphical program, referred to as a front panel. The string control node may operate to receive a string value from the GUI and provide the string to a node in the graphical program. As may be seen, the user has selected the output terminal on the node, where the terminal is indicated by a dark filled circle, and the selection is indicated by the tilted dark rectangle. As FIG. 9A also shows, in response to the user selection of the terminal of the node, a palette is presented that includes two copies of a replace substring node, and a string length node. Note that in each of the copies of the replace substring node, a respective terminal is indicated by a dark filled circle that is larger than the other terminals of the node, where the first or top copy of the node indicates the "substring (" ")" terminal, whereas the second or lower copy of the node indicates the "string" terminal. Thus, the replace substring node has two entries in the suggested nodes menu. Note that since the user most frequently connects to the "substring" terminal, that entry appears first. Depending on which of the two entries the user selects, the starting terminal may automatically connect to either the "substring" or the "string" terminal. In this way, even though there are several options on a given node that are valid to connect to, the user can quickly select the desired one.

Figure 9B:
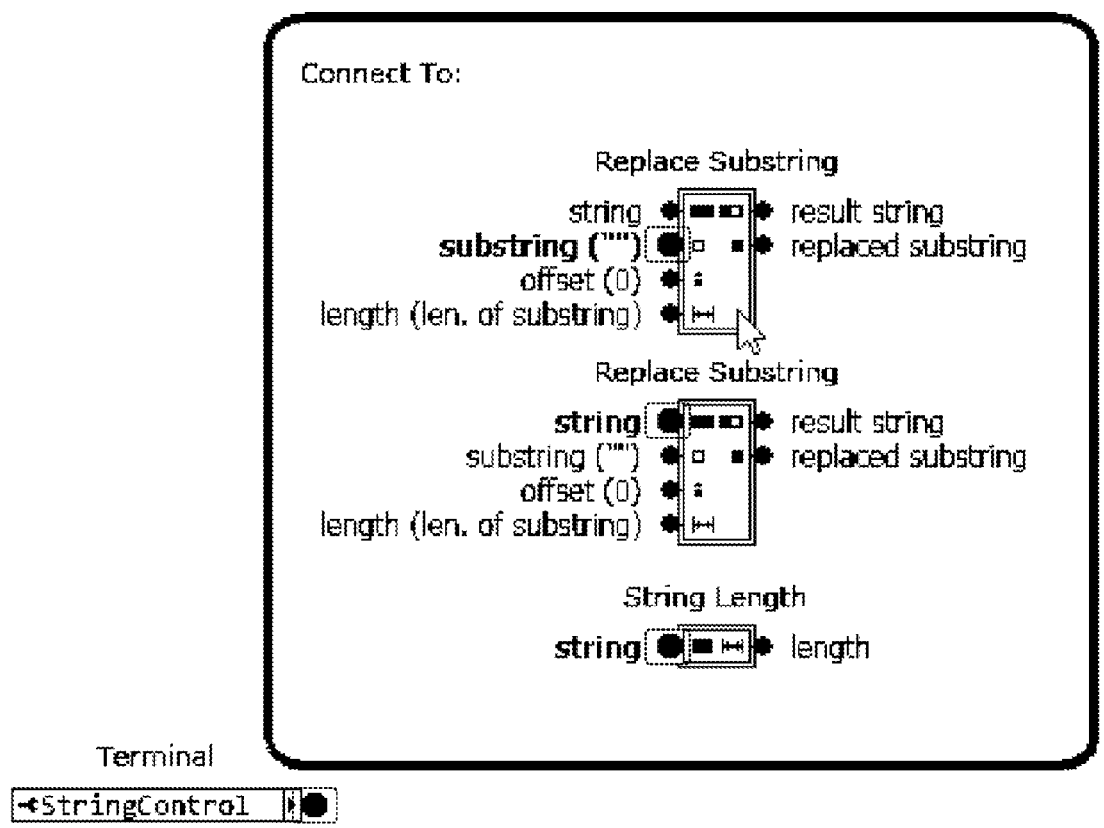
Figure 9C:
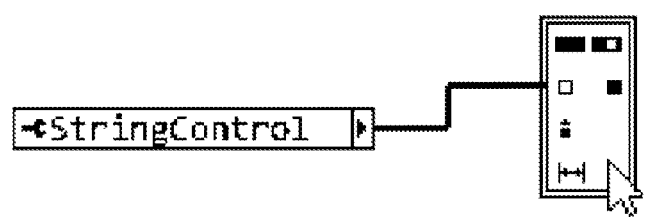
Figure 9D:
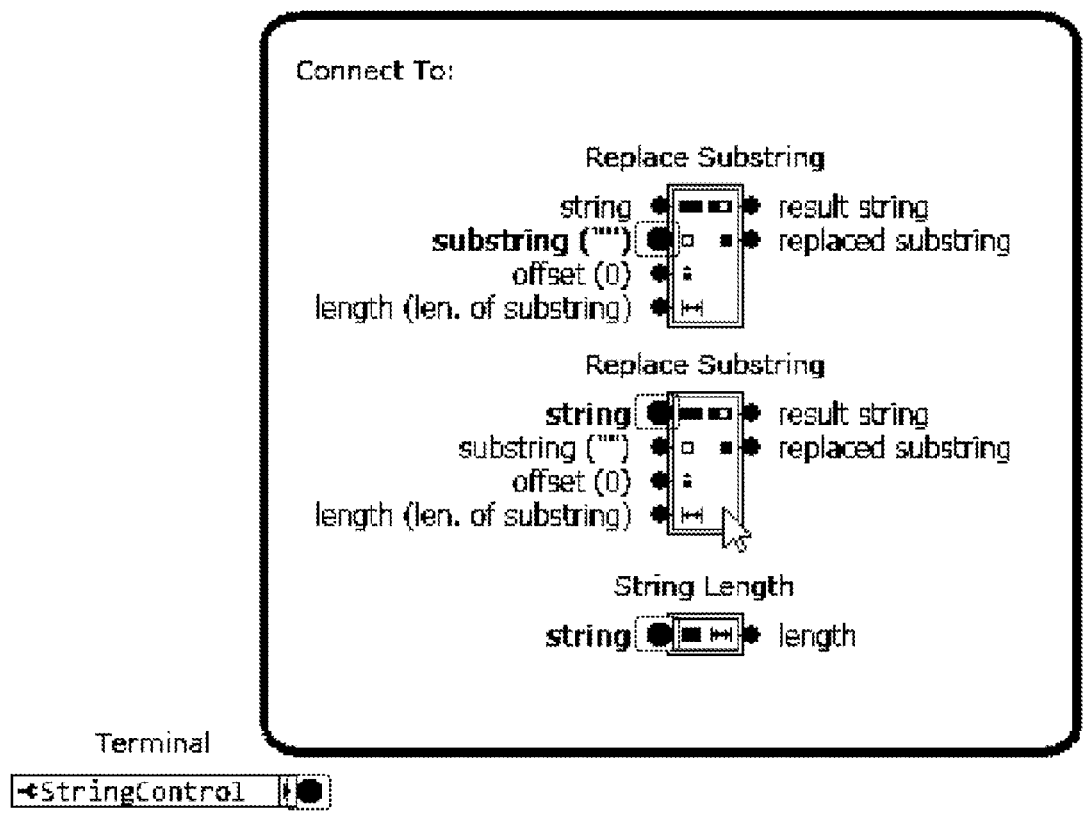
Figure 9E:
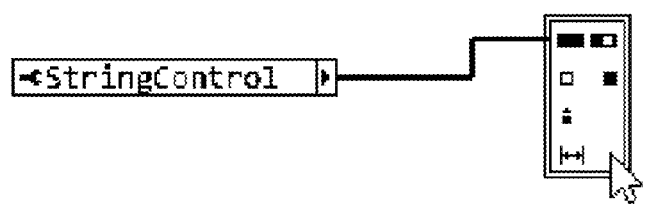

FIG. 9B illustrates user selection of the first copy of the node (which indicates the "substring (" ")" terminal) via the mouse cursor, and FIG. 9C illustrates automatic inclusion and connection of the selected node to the string control node via the indicated "substring (" ")" terminal. Alternatively, FIG. 9D illustrates user selection of the second copy of the node (which indicates the "string" terminal) via the mouse cursor, and FIG. 9E illustrates automatic inclusion and connection of the selected node to the string control node via the indicated "string" terminal.

As mentioned above with respect to FIGS. 8B and 8C, in some embodiments, once the user has selected a suggested node, the node may "stick" to the cursor, e.g., as a "ghost" node, until the user drops the node into the graphical program. This feature is indicated in FIGS. 8C, 9C, and 9E, by the presence of the cursor on the newly included node.

In a related embodiment, displaying the first suggested node as a shadow node that follows a mouse cursor may include automatically connecting a terminal of the first suggested node to the selected terminal of the first node, and displaying the connection between the terminal of the first suggested node and the one or more terminals of the at least one node of the one or more nodes in the graphical program. Thus, once the user selects a terminal (of a suggested node), the first node and the selected suggested node may be automatically connected (via their selected terminals), and the connection or wire may dynamically adjust as the user moves the cursor around the program, e.g., eventually dropping the connected (suggested) node at some location in the program.

In another embodiment, the user may select the terminal on a suggested node for connection. For example, when the suggested nodes are presented to the user, instead of including a copy of a node for each specific terminal ID that the user might wish to connect to, only one copy of any given node may be presented, and the user may select the desired terminal by clicking on it. Upon clicking on the desired terminal, a shadow node may then be created, and the node may be connected to the original node between the originally selected terminal and the selected terminal of the selected suggested node. The user may then place the node on the diagram as desired. In some embodiments of this approach, only "suggested" terminals may be displayed on each suggested node, although in others, all of the terminals may be displayed.

In one embodiment, the method may also include receiving user input specifying suggestion criteria, and the one or more suggested nodes may be automatically determined based also on the suggestion criteria. For example, the user may provide input specifying some configurable attribute or property of the terminal, such as data size, etc., or specifying intended use, etc., i.e., any type of additional information which may have bearing on which terminals/nodes may be connected to the terminal.

Thus, various embodiments of the above-described techniques may allow the user to develop the diagram with greater ease and speed, e.g., by learning how the user (or other developers) commonly connects nodes in block diagrams, and providing easy means or gestures to repeat those common actions. For example, in one summary example, as the user creates connections on the block diagram, the method may record which two terminals and which two nodes were connected. More generally, the method may record how frequently each unique connection is made by the user. The record may thus include, for each uniquely identifiable terminal in the development environment, which terminals on which nodes are most commonly connected to it. To make use of this record, a user may pop-up (right click, hover, etc.) on an unconnected terminal. The method may then access the record for that specific terminal, and populate a menu with images (or other descriptions) of the most frequently connected nodes, with the frequently connected terminal highlighted (if a user frequently connects this kind of terminal to more than one terminal on a node, the node may appear twice in the list, each appearance highlighting one of the possible terminals). Upon selecting the desired node, an instance of that node may be created in the block diagram, and a wire, connecting the starting terminal to the desired terminal on the new node may be created.

Described in a slightly different manner, one embodiment of the above techniques may be applicable in the following situation: A user is creating a graphical program, and has already included some number of nodes in the block diagram of the graphical program. The user wishes to add a new node, which he will connect to one of the previously existing nodes. The connection will exist between a specific terminal on the existing node and a specific terminal on the new node. The user is aware of the desired connection without having to place the new node in the program.

In this exemplary embodiment, the user selects the specific terminal on the existing node. Upon selection of the node, a new display is shown to the user, containing a selection of suggested nodes. These suggested nodes are nodes to which the user frequently connects the existing node from the selected specific terminal. The suggestions may also indicate in some way to which terminal on each suggested node the connection may be made. The user may then select the suggested node that matches the desired addition to the program he would like to make.

Upon choosing one of the suggestions, the suggestion display may disappear. The user now has a copy of suggested node that he selected attached to the cursor, in the same manner as if he had created a new instance of that node and were trying to place it. The specific terminal of the original existing node is now connected to the indicated terminal on the node attached to the cursor (the terminal that was indicated in the suggestion display). The user is free to place the node as he desires in the program, and it is already connected to the starting existing node.

In order to provide useful suggestions, the system may monitor the usage of the editor. For example, the system may maintain information about which nodes are frequently connected together, and via which terminals. Therefore as the user creates more programs, the system may provide better suggestions, since the suggestions will be based on more data regarding the user's habits. Each connection the user makes may be counted, and the frequency of connections made from any given terminal may determine which nodes are suggested, with the most frequent given the most prominent suggestion. For example, the most likely target may be presented at the top of the palette or menu.

Graphical programs may also be written using object oriented techniques. For example, a graphical object oriented programming language may support "classes" containing "data members" as well as "method members", similar to text-based object oriented programming languages. In a graphical program the method members may be expressed as graphical program nodes. Each method member node may include an input terminal and an output terminal referring to the class that contains the method member node.

In some embodiments, a graphical program utilizing object oriented (OO) techniques may also use inheritance. For example, when inheriting from a parent class, a child class may be granted access to the parent class's method member nodes. With reference to the above-described feature of suggesting a node (or nodes) based on a currently selected terminal, in one object oriented embodiment, if the currently selected terminal refers to a class, the analysis for determining the node (or nodes) may take into account not only the current terminal (and node), but also the relationship between the current node and any existing class-inheritance hierarchies, such that methods declared and implemented in a parent class may be suggested.

A graphical program utilizing object oriented techniques may also utilize public and private member method nodes. For example, it may be legal or allowed to use a public member method node in the creation of a node outside the context of the class, whereas it may only be legal or allowed to use a private member method node within class member nodes. In regards to suggesting a node or nodes based on the currently selected terminal, if the currently selected terminal refers to a class, the analysis for determining the node may take into account whether or not the current node is a context that excludes or includes private members.

Thus, in one embodiment, the graphical program may be or include an object oriented graphical program, where the nodes and terminals have respective class inheritance hierarchies, and the information relating terminal IDs of the one or more nodes to respective terminal IDs of nodes most commonly connected to terminals of the one or more nodes may include relationships between the class inheritance hierarchy of the selected terminal and the class inheritance hierarchy of the one or more suggested nodes. Moreover, in further embodiments, some nodes may implement private member nodes of a class to which the graphical program does not have access, and the automatically analyzing may conditionally exclude suggesting nodes to which the graphical program does not have access.

Similarly, in much the same way some text-based programs support polymorphic function calls, a graphical program may include polymorphic nodes. For example, in one embodiment, a polymorphic node may include several sub-nodes and the type of terminal wired into the input terminals of the polymorphic node. The type of the terminal may affect which of the contained sub-nodes are executed on the input parameters.

Thus, in some embodiments, a graphical program may include one or more polymorphic nodes, each of which may select which sub-node is executed based upon the type of the terminal wired into the sub-node. In one embodiment, with regards to suggesting a node (or nodes) based on the currently selected terminal, if the currently selected terminal is on a polymorphic node, the analysis to determine the one or more suggested nodes may include analysis across all sub-nodes of the polymorphic node whose terminal is selected. More generally, in one embodiment, some nodes may be polymorphic nodes, where each polymorphic node includes two or more respective sub-nodes that are executable in lieu of the polymorphic node based on a type of terminal wired to the polymorphic node. The information relating terminal IDs of the one or more nodes to respective terminal IDs of nodes most commonly connected to terminals of the one or more nodes may further include information regarding sub-nodes of polymorphic nodes and terminals of sub-nodes of polymorphic nodes. In other words, the method may include analyzing the polymorphic aspects of the nodes (and terminal types), e.g., the sub-nodes implementing the polymorphism, in determining the suggested nodes to present to the user.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for editing a graphical program, the method comprising:
utilizing a computer to implement:
including one or more nodes in a graphical program in response to user input selecting the one or more nodes, wherein the graphical program comprises a plurality of interconnected nodes that visually indicate functionality of the graphical program, wherein each node of the one or more nodes comprises a respective one or more terminals for receiving input to or providing output from the node;

receiving user input selecting a terminal on a first node of the one or more nodes in the graphical program to which a node is to be connected; and automatically presenting one or more suggested nodes to include in the graphical program based on the selected terminal of the first node, wherein the one or more suggested nodes are selectable by the user for inclusion in the graphical program, wherein said automatically presenting the one or more suggested nodes comprises indicating at least one terminal on each of the one or more suggested nodes via which a connection to the selected terminal can be made.

2. The method of claim 1, further comprising:

utilizing the computer to implement:

including a first suggested node of the one or more suggested nodes in the graphical program in response to user input selecting the first suggested node, wherein said including comprises automatically connecting a terminal of the first suggested node to the selected terminal of the first node in the graphical program.

3. The method of claim 2, the method further comprising:

utilizing the computer to implement:

ceasing presentation of the one or more suggested nodes in response to the user input selecting the first suggested node.

4. The method of claim 1, wherein each terminal of each node has a unique identification (ID), the method further comprising:

utilizing the computer to implement:

automatically analyzing information relating terminal IDs of the one or more nodes to respective terminal IDs of nodes most commonly connected to terminals of the one or more nodes; and automatically determining the one or more suggested nodes based on said automatically analyzing;

wherein said automatically presenting the one or more suggested nodes is performed in response to said automatically determining.

5. The method of claim 4, wherein the information relating terminal IDs of the one or more nodes to respective terminal IDs of nodes most commonly connected to terminals of the one or more nodes is static.

6. The method of claim 4, wherein said analyzing and said determining comprises using a heuristic to determine the one or more suggested nodes based on the terminal IDs of the one or more nodes in the graphical program.

7. The method of claim 4, wherein the information relating terminal IDs of the one or more nodes to respective terminal IDs of nodes most commonly connected to terminals of the one or more nodes comprises previously stored data regarding connections between terminals of nodes in one or more other graphical programs.

8. The method of claim 7, further comprising:

wherein the previously stored data regarding connections between terminals of nodes in one or more other graphical programs are specific to graphical programs created by the user.

9. The method of claim 4, the method further comprising:

utilizing the computer to implement:

storing information regarding connections between terminals of nodes previously included in the graphical program;

wherein the information relating terminal IDs of the one or more nodes to respective terminal IDs of nodes most commonly connected to terminals of the one or more nodes comprises the information regarding connections between terminals of nodes previously included in the graphical program.

10. The method of claim 4, wherein the graphical program comprises an object oriented graphical program, wherein the nodes and terminals have respective class inheritance hierarchies; and wherein the information relating terminal IDs of the one or more nodes to respective terminal IDs of nodes most commonly connected to terminals of the one or more nodes comprises relationships between the class inheritance hierarchy of the selected terminal and the class inheritance hierarchy of the one or more suggested nodes.

11. The method of claim 10, wherein some nodes implement private member nodes of a class to which the graphical program does not have access; and wherein said automatically analyzing conditionally excludes suggesting nodes to which the graphical program does not have access.

12. The method of claim 4, wherein some nodes are polymorphic nodes, each polymorphic node comprising two or more respective sub-nodes that are executable in lieu of the polymorphic node based on a type of terminal wired to the polymorphic node; and wherein the information relating terminal IDs of the one or more nodes to respective terminal IDs of nodes most commonly connected to terminals of the one or more nodes further includes information regarding sub-nodes of polymorphic nodes and terminals of sub-nodes of polymorphic nodes.

13. The method of claim 1, wherein said automatically presenting the one or more suggested nodes comprises displaying the one or more suggested nodes as shadow nodes that follow a mouse cursor.

14. The method of claim 1, wherein said automatically presenting the one or more suggested nodes comprises displaying the one or more suggested nodes in a palette, wherein the one or more suggested nodes are selectable from the palette by the user for inclusion in the graphical program.

15. The method of claim 1, wherein said automatically presenting the one or more suggested nodes comprises providing audio suggestions indicating the one or more suggested nodes.

16. The method of claim 1, wherein said automatically presenting the one or more suggested nodes, and indicating at least one terminal on each of the one or more suggested nodes via which a connection to the selected terminal can be made comprises:

for each of the one or more suggested nodes, displaying a respective copy of the node for each indicated terminal of the node, including indicating the indicated terminal in the displayed copy.

17. The method of claim 1, further comprising:

utilizing the computer to implement:

receiving user input specifying suggestion criteria;

wherein said automatically determining the one or more suggested nodes is further based on the suggestion criteria.

18. The method of claim 1,
wherein said automatically presenting the one or more suggested nodes comprises indicating at least one terminal on each of the one or more suggested nodes via which a connection to the selected terminal of the first node can be made;
the method further comprising:
utilizing the computer to implement:
receiving user input selecting a first suggested node from the one or more suggested nodes;
displaying the first suggested node as a shadow node that follows a mouse cursor; and
including the first suggested node in the graphical program in response to user input indicating inclusion of the first suggested node in the graphical program.

19. The method of claim 18, wherein said displaying the first suggested node as a shadow node that follows a mouse cursor comprises:
automatically connecting a terminal of the first suggested node to the selected terminal of the first node; and
displaying the connection between the terminal of the first suggested node and the one or more terminals of the at least one node of the one or more nodes in the graphical program.

20. The method of claim 1,
wherein the graphical program comprises a graphical data flow program.

21. The method of claim 1,
wherein the graphical program is operable to perform one or more of:
an industrial automation function;
a process control function;
a test and measurement function.

22. A non-transitory computer-accessible memory medium that stores program instructions executable by a processor to perform:
including one or more nodes in a graphical program in response to user input selecting the one or more nodes, wherein the graphical program comprises a plurality of interconnected nodes that visually indicate functionality of the graphical program, wherein each node of the one or more nodes comprises a respective one or more terminals for receiving input to or providing output from the node;
receiving user input selecting a terminal on a first node of the one or more nodes in the graphical program to which a node is to be connected; and
automatically presenting one or more suggested nodes to include in the graphical program based on the selected terminal of the first node, wherein the one or more suggested nodes are selectable by the user for inclusion in the graphical program, wherein said automatically presenting the one or more suggested nodes comprises indicating at least one terminal on each of the one or more suggested nodes via which a connection to the selected terminal can be made.

23. A computer-implemented method for editing a graphical program, the method comprising:
utilizing a computer to implement:
including one or more nodes in a graphical program in response to user input selecting the one or more nodes, wherein the graphical program comprises a plurality of interconnected nodes that visually indicate functionality of the graphical program, wherein each node of the one or more nodes comprises a respective one or more terminals for receiving input to or providing output from the node;
receiving user input selecting a terminal on a first node of the one or more nodes in the graphical program to which a node is to be connected, wherein each terminal of each node has a unique identification (ID);
automatically analyzing information relating terminal IDs of the one or more nodes to respective terminal IDs of nodes most commonly connected to terminals of the one or more nodes;
automatically determining the one or more suggested nodes based on said automatically analyzing; and
automatically presenting the one or more suggested nodes to include in the graphical program based on the selected terminal of the first node, wherein the one or more suggested nodes are selectable by the user for inclusion in the graphical program, wherein said automatically presenting the one or more suggested nodes is performed in response to said automatically determining.

24. The computer-implemented method of claim 23, further comprising:
utilizing the computer to implement:
including a first suggested node of the one or more suggested nodes in the graphical program in response to user input selecting the first suggested node, wherein said including comprises automatically connecting a terminal of the first suggested node to the selected terminal of the first node in the graphical program.

25. A non-transitory computer-accessible memory medium that stores program instructions executable by a processor to:
include one or more nodes in a graphical program in response to user input selecting the one or more nodes, wherein the graphical program comprises a plurality of interconnected nodes that visually indicate functionality of the graphical program, wherein each node of the one or more nodes comprises a respective one or more terminals for receiving input to or providing output from the node;
receive user input selecting a terminal on a first node of the one or more nodes in the graphical program to which a node is to be connected, wherein each terminal of each node has a unique identification (ID);
automatically analyze information relating terminal IDs of the one or more nodes to respective terminal IDs of nodes most commonly connected to terminals of the one or more nodes;
automatically determine the one or more suggested nodes based on said automatically analyzing; and
automatically present the one or more suggested nodes to include in the graphical program based on the selected terminal of the first node, wherein the one or more suggested nodes are selectable by the user for inclusion in the graphical program, wherein said automatically presenting the one or more suggested nodes is performed in response to said automatically determining.

26. The non-transitory computer-accessible memory medium of claim 25, wherein the program instructions are executable by a processor to:
include a first suggested node of the one or more suggested nodes in the graphical program in response to user input selecting the first suggested node, wherein to include the first suggested node, the program instructions are executable to automatically connect a terminal of the first suggested node to the selected terminal of the first node in the graphical program.

* * * * *